United States Patent
Hamada (10) Patent No.: US 9,363,496 B2
(45) Date of Patent: Jun. 7, 2016

(54) MOVING IMAGE GENERATION DEVICE

(71) Applicant: SONY COMPUTER ENTERTAINMENT INC., Tokyo (JP)

(72) Inventor: Masaaki Hamada, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/916,703

(22) Filed: Jun. 13, 2013

(65) Prior Publication Data

US 2014/0016913 A1 Jan. 16, 2014

(30) Foreign Application Priority Data

Jul. 12, 2012 (JP) ................... 2012-157007

(51) Int. Cl.
| | |
|---|---|
| G11B 27/00 | (2006.01) |
| H04N 5/93 | (2006.01) |
| H04N 9/87 | (2006.01) |
| H04N 5/77 | (2006.01) |
| H04N 9/82 | (2006.01) |
| G06F 21/62 | (2013.01) |
| H04N 5/91 | (2006.01) |

(52) U.S. Cl.
CPC .............. *H04N 9/87* (2013.01); *G06F 21/6254* (2013.01); *H04N 5/772* (2013.01); *H04N 9/8205* (2013.01); *H04N 5/91* (2013.01)

(58) Field of Classification Search
CPC ............................. H04N 1/387; H04N 1/4493
USPC .......................................................... 386/278
See application file for complete search history.

(56) References Cited

U.S. PATENT DOCUMENTS

| 2006/0187305 A1* | 8/2006 | Trivedi et al. ................. 348/169 |
| 2008/0259154 A1* | 10/2008 | Garrison et al. ........... 348/14.01 |
| 2009/0207269 A1* | 8/2009 | Yoda .......................... 348/222.1 |
| 2010/0056268 A1* | 3/2010 | Langan et al. .................. 463/29 |

FOREIGN PATENT DOCUMENTS

| CN | 1637760 | 7/2005 |
| CN | 101510957 | 8/2009 |

OTHER PUBLICATIONS

Chinese First Office Action dated Oct. 16, 2015 from corresponding Application No. 201310292016.X.

* cited by examiner

*Primary Examiner* — Hung Dang
*Assistant Examiner* — Girumsew Wendmagegn
(74) *Attorney, Agent, or Firm* — Katten Muchin Rosenman LLP (57) ABSTRACT

Provided is a moving image generation device, which is configured to: render a frame image including a plurality of image elements; output rendering position information specifying a rendering position within the frame image of a confidential element whose viewing is to be restricted among the plurality of image elements; and generate a moving image by using the frame image while performing display restriction processing on a target region within the frame image which is specified by the rendering position information.

6 Claims, 4 Drawing Sheets

MOVING IMAGE GENERATION DEVICE

CROSS-REFERENCE TO RELATED APPLICATION

The present application claims priority from Japanese application JP2012-157007 filed on Jul. 12, 2012, the content of which is hereby incorporated by reference into this application.

BACKGROUND OF THE INVENTION

1. Field of the Invention

The present invention relates to a moving image generation device for generating a moving image to be published to a third party, a moving image generation method, and an information storage medium.

2. Description of the Related Art

In recent years, data on a moving image has been published to unspecified viewers by, even privately, uploading the data onto a server on the Internet, distributing the data in real time, or other such method. For example, some consumer game machines generate a moving image showing how a game is being played while a user is playing the game, and upload the generated moving image onto a server.

When the moving image is published to unspecified viewers, it is necessary to prevent information whose viewing is undesirable (such as personal information) from being included in the moving image. In order to prevent such information from being viewed, a producer may specify a display position of such information each time in the process for producing the moving image and perform pixelization on the specified display position or perform such other editing so as to restrict displaying of the information. However, it is not easy to perform such editing manually.

SUMMARY OF THE INVENTION

The present invention has been made in view of the above-mentioned circumstances, and has an object to provide a moving image generation device capable of performing, when generating a moving image to be published, display restriction processing easily on information whose viewing is to be restricted, a moving image generation method, and an information storage medium.

According to an exemplary embodiment of the present invention, there is provided a moving image generation device, including: a rendering section for rendering a frame image including a plurality of image elements; a rendering position information output section for outputting rendering position information specifying a rendering position within the frame image of a confidential element whose viewing is to be restricted among the plurality of image elements; and a moving image generation section for generating a moving image by using the frame image, and when generating the moving image, performing display restriction processing on a target region within the frame image which is specified by the rendering position information.

Further, according to an exemplary embodiment of the present invention, there is provided a moving image generation method, including: rendering a frame image including a plurality of image elements; outputting rendering position information specifying a rendering position within the frame image of a confidential element whose viewing is to be restricted among the plurality of image elements; and generating a moving image by using the frame image, and when generating the moving image, performing display restriction processing on a target region within the frame image which is specified by the rendering position information.

Further, according to an exemplary embodiment of the present invention, there is provided a non-transitory computer readable information storage medium having a program stored thereon, the program including instructions for causing a computer to execute the procedures of: rendering a frame image including a plurality of image elements; outputting rendering position information specifying a rendering position within the frame image of a confidential element whose viewing is to be restricted among the plurality of image elements; and generating a moving image by using the frame image, and when generating the moving image, performing display restriction processing on a target region within the frame image which is specified by the rendering position information.

DETAILED DESCRIPTION OF THE INVENTION

Referring to the drawings, an embodiment of the present invention is described below in detail.

Figure 1:
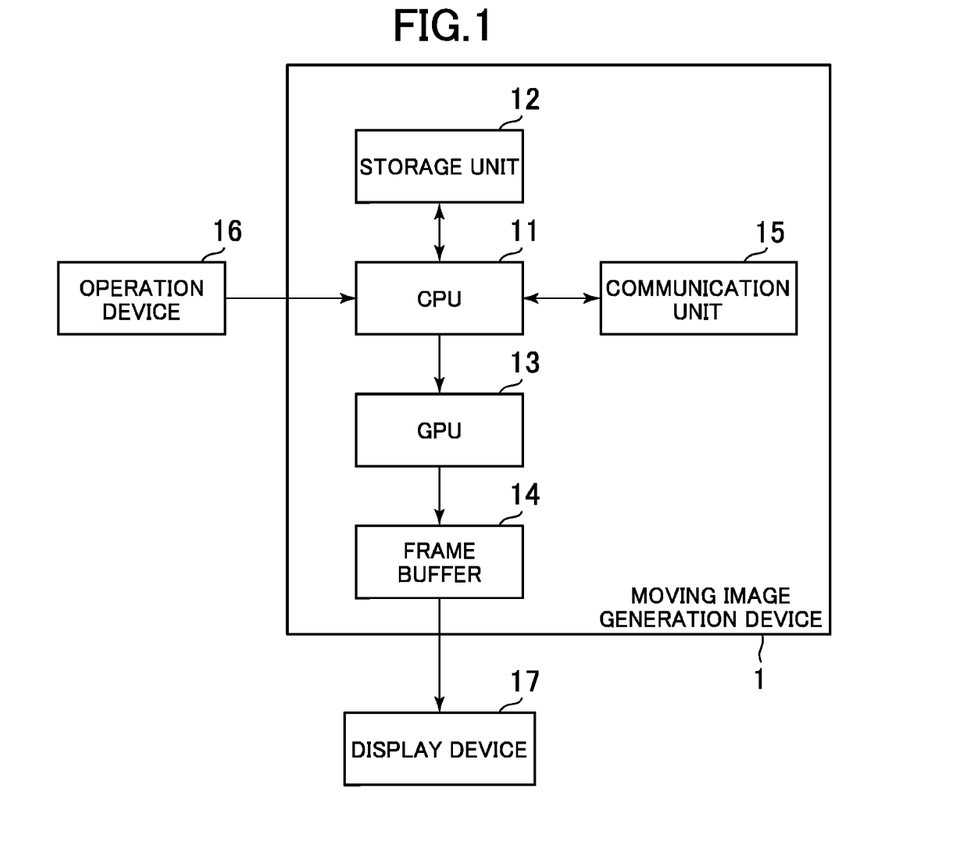
FIG. 1 is a block diagram illustrating a configuration of a moving image generation device according to an embodiment of the present invention.

A moving image generation device 1 according to the embodiment of the present invention is an information processing device such as a consumer game machine, a portable game machine, and a personal computer, and includes a CPU 11, a storage unit 12, a GPU 13, a frame buffer 14, and a communication unit 15 as illustrated in FIG. 1. Further, the moving image generation device 1 is connected to an operation device 16 and a display device 17. In this embodiment, the moving image generation device 1 generates a moving image intended to be published to a third party (hereinafter referred to as publishing moving image). In the following, as a specific example, the moving image generation device 1 is a game device for executing a game program, and displays on the display device 17 a game moving image which is generated as a result of executing the game program so as to enable a user to view the game moving image. The moving image generation device 1 then uses this game moving image to generate the publishing moving image.

The CPU 11 executes various kinds of information processing in accordance with a program stored in the storage unit 12. In this embodiment, the CPU 11 executes the game program.

The storage unit 12 includes a memory element such as a RAM, and stores the program to be executed by the CPU 11 and various kinds of data. The storage unit 12 also functions as a working memory of the CPU 11.

In response to the instruction issued from the CPU 11, the GPU 13 executes rendering processing of rendering a frame image to be displayed on the display device 17 at every predetermined period of time. The frame image rendered by the GPU 13 is written into the frame buffer 14, and is converted into a video signal at a predetermined timing to be output to the display device 17. With such processing being repeated at every predetermined time interval, the display device 17 displays the game moving image including a plurality of frame images which are rendered by the GPU 13. The display device 17 may be, for example, a liquid crystal display or an organic EL display. Further, in this case, the frame buffer 14 into which the frame image is to be written is provided separately from the storage unit 12, but the frame buffer 14 may be a memory area which is allocated within the storage unit 12.

The communication unit 15 is an interface based on standards such as a LAN, and transmits/receives information to/from other devices in response to the instruction issued from the CPU 11. In this embodiment, the publishing moving image generated by the moving image generation device 1 is transmitted to other information processing devices via the communication unit 15.

The operation device 16 is, for example, a controller of the consumer game machine. The operation device 16 receives an input of an operation from the user and outputs a result of the input to the CPU 11. In this embodiment, the user of the moving image generation device 1 plays a game by inputting his/her operation to the operation device 16, and views the game moving image which is displayed on the display device 17 after details of the operation are reflected thereon. Note that, the operation device 16 and the display device 17 may be integrated with the moving image generation device 1.

Figure 2:
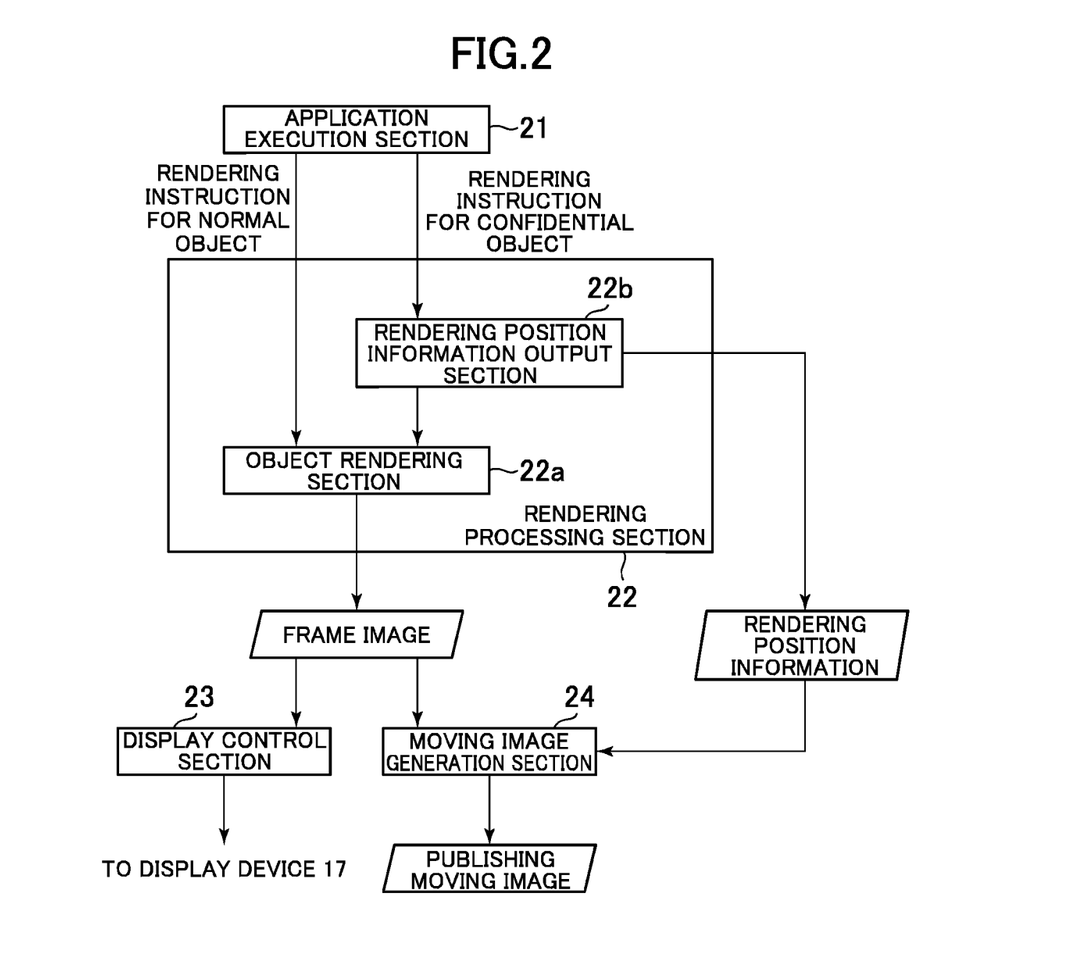
FIG. 2 is a functional block diagram illustrating functions of the moving image generation device according to the embodiment of the present invention.

Next, functions realized by the moving image generation device 1 are described with reference to a functional block diagram of FIG. 2. As illustrated in FIG. 2, the moving image generation device 1 functionally includes an application execution section 21, a rendering processing section 22, a display control section 23, and a moving image generation section 24. Moreover, the rendering processing section 22 includes an object rendering section 22a and a rendering position information output section 22b. Of those functions, the application execution section 21 and the moving image generation section 24 are realized by the CPU 11 executing the program stored in the storage unit 12. Further, the object rendering section 22a, the rendering position information output section 22b, and the display control section 23 are realized by the GPU 13.

The application execution section 21 is realized by the CPU 11 executing an application program stored in the storage unit 12. In this embodiment, as described above, the application execution section 21 executes game processing in accordance with the game program. Further, the application execution section 21 outputs a rendering instruction to the rendering processing section 22 in order to render the frame image showing the result of the game processing.

The frame image includes a plurality of objects (image elements). The objects constituting the frame image may be, for example, a character and background appearing in a game and parameter information relating to the game. The application execution section 21 outputs, for each of the objects, an instruction to render a corresponding object to the rendering processing section 22.

The objects constituting the frame image may include some pieces of information whose viewing by the public is undesirable. Such information whose viewing by the public needs to be restricted is hereinafter referred to as confidential information. Specific examples of the confidential information include personal information of the user or other game participants (such as user ID and photograph of his/her face). Moreover, it is sometimes desirable that information that can be a spoiler for the game progress, such as the name or appearance of a character appearing in the latter half of the game, be set as the confidential information. Such confidential information needs to be included in the game moving image which is viewed by the user while the user is playing the game, but needs to be inhibited from being displayed as it is when the game moving image is to be viewed by the third party. In view of this, the application execution section 21 changes an output destination of the rendering instruction depending on whether the object is an object including the confidential information (hereinafter referred to as confidential object) or an object other than the confidential object (hereinafter referred to as normal object). To be specific, regarding the normal object, the application execution section 21 issues a rendering command which gives a specific instruction on details of rendering (such as color, shape, and display position of the object) to the object rendering section 22a. On the other hand, regarding the confidential object, the application execution section 21 outputs a rendering instruction to the rendering position information output section 22b. The rendering instruction issued for the confidential object may be the same format as the rendering command issued for the normal object, but may be formed of a data format different from that of the normal object. For example, the rendering instruction for the confidential object may be an instruction including details of the confidential information themselves such as a user ID and information specifying a position within the frame image (two-dimensional coordinates) at which the confidential object representing the details of the confidential information is to be rendered.

The rendering processing section 22 renders the frame image in accordance with the rendering instruction output by the application execution section 21. To be specific, the object rendering section 22a renders each object included in the frame image in accordance with the rendering commands issued by the application execution section 21 and the rendering position information output section 22b to be described later, and writes the result of rendering into the frame buffer 14. The frame image is thus generated in the frame buffer 14.

The rendering position information output section 22b receives the rendering instruction for the confidential object from the application execution section 21. The rendering position information output section 22b then specifies a position within the frame image at which the confidential object is to be rendered based on details of the rendering instruction, and outputs information indicating the rendering position. This information on the rendering position of the confidential object is hereinafter referred to as rendering position information. The rendering position information output by the rendering position information output section 22b is temporarily stored in the storage unit 12. The rendering position information is information specifying the position and size of a region in which the confidential object is to be rendered with two-dimensional coordinate values that are set in the frame image, and is determined in consideration of the size and shape of the confidential object which is to be actually rendered.

Further, the rendering position information output section 22b issues to the object rendering section 22a the rendering command for the confidential object in response to the rendering instruction received from the application execution section 21. This rendering command issued to the object rendering section 22a may be the same format as the rendering command issued to the object rendering section 22a by the application execution section 21 regarding the normal object. In this way, the object rendering section 22a does not need to distinguish the confidential object from the normal object, and only needs to render each object in accordance with the rendering command received from the application execution section 21 and the rendering position information output section 22b.

After the rendering processing section 22 finishes rendering one frame image, in response to the instruction issued from the application execution section 21, the display control section 23 outputs the frame image written into the frame buffer 14 to the display device 17 as a video signal. In this manner, the frame image written into the frame buffer 14 is displayed on the screen of the display device 17. The display control section 23 repeatedly executes such processing at a predetermined frame rate so that the game moving image showing a situation in which the game is being played is displayed on the screen of the display device 17.

The moving image generation section 24 uses the frame image written into the frame buffer 14 to generate the publishing moving image. To be specific, the moving image generation section 24 encodes the frame image written into the frame buffer 14 to generate data on the publishing moving image in the MPEG format, for example. This publishing moving image basically includes the same details as those of the game moving image displayed on the display device 17 by the display control section 23. However, it is undesirable that the confidential information be included as it is in the publishing moving image to be published to the third party. In view of this, when encoding the frame image written into the frame buffer 14, the moving image generation section 24 performs display restriction processing on a region within the frame image, in which the confidential object is rendered.

The display restriction processing as used herein refers to image processing of causing details of a region that has been subjected to this processing to reach a state in which the details cannot be easily recognized when seen from the human eye. When executing the display restriction processing, the moving image generation section 24 determines a region within the frame image, on which the display restriction processing is to be executed, by using the rendering position information stored temporarily in the storage unit 12 by the rendering position information output section 22b. Through use of the rendering position information, the moving image generation section 24 can appropriately determine a region within the frame image including various objects that is to be subjected to the display restriction processing.

The display restriction processing may be, for example, processing of filling the subject region with a specific color or filtering processing of performing pixelization or blurring on the subject region. Alternatively, the display restriction processing may be processing of lowering the resolution of the subject region to such an extent that details of the image cannot be recognized. In particular, there are known some video encoding engines supporting a region of interest (ROI). This is the technology for encoding a specific region (usually a region which a viewer is assumed to be particularly interested in) in one image at a higher bit rate than those of other regions. When the moving image generation section 24 is realized by such video encoding engine, the technology for performing encoding at bit rates that are different for each region is applied thereto in this way so that the moving image generation section 24 can relatively easily perform such encoding that the resolution of the region including the confidential object is lower than the resolutions of other regions. To be specific, the moving image generation section 24 determines, for each of the blocks obtained by dividing the frame image into blocks having a fixed size, whether or not the block includes a region specified by the rendering position information. Then, when it is determined that the block includes the region specified by the rendering position information, the moving image generation section 24 performs encoding at a bit rate that is relatively lower than otherwise. In this manner, the moving image generation section 24 encodes only the block within the entire frame image, in which the confidential object is rendered, at a low resolution so that the viewer cannot recognize details of the confidential object.

Figure 3:
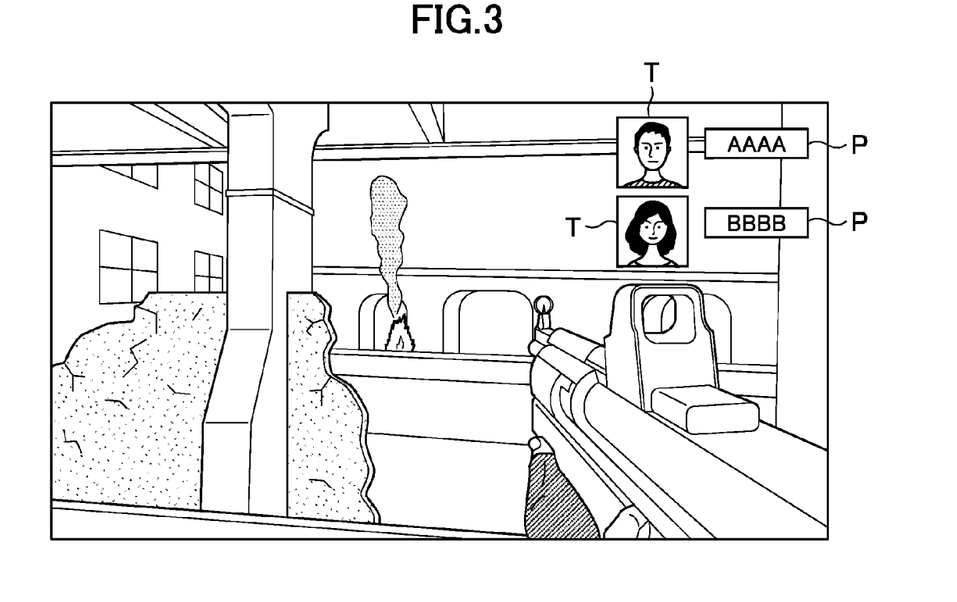
FIG. 3 is an example of a frame image including confidential information.
Figure 4:
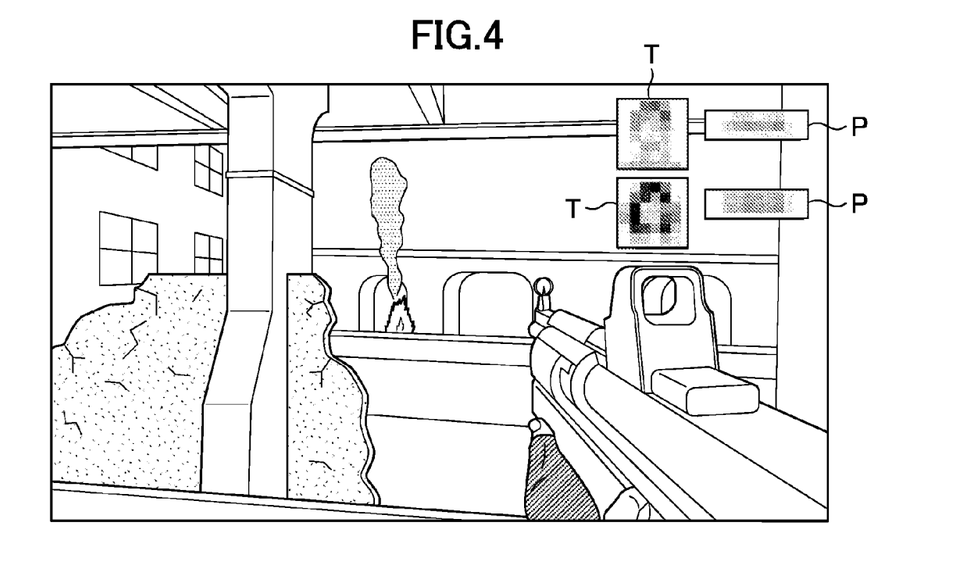
FIG. 4 is an image showing a result of performing, on the frame image of FIG. 3, display restriction processing for confidential information.

FIG. 3 is a view showing an example of the frame image including the confidential object. In the frame image, in the upper right part of a game image obtained by rendering a situation in a three-dimensional space in which enemy characters and the like exist from a first-person viewpoint, objects representing player names P and thumbnail images T (photographs of the players' face) of the plurality of players participating in the game are disposed. In this case, the player names P and the thumbnail images T are pieces of confidential information, and the application execution section 21 outputs to the rendering position information output section 22b the rendering instruction for the confidential objects representing those pieces of confidential information. On the other hand, the application execution section 21 directly outputs the rendering instruction for objects disposed in the three-dimensional space to the object rendering section 22a. On the display device 17, the frame image shown in FIG. 3 is displayed as it is, and is viewed by the user of the moving image generation device 1. Meanwhile, the moving image generation section 24 encodes the frame image shown in FIG. 3 while performing the display restriction processing on the region in which the confidential object is rendered. As a result, in the frame image of the publishing moving image corresponding to the frame image shown in FIG. 3, as shown in FIG. 4, the resolutions of the player names P and the thumbnail images T are lowered and hence details thereof are hard to be recognized by the human eye.

The publishing moving image generated by the moving image generation section 24 may be distributed by streaming in real time to other information processing devices while the user is playing the game. Alternatively, the publishing moving image may be temporarily stored in the storage unit 12 as a data file of the moving image, and then, the stored publishing moving image may be uploaded onto a server for publishing moving images or the like in response to an instruction issued from the user, for example.

As described above, according to the moving image generation device 1 of this embodiment, when rendering the frame image constituting the game moving image, the rendering processing section 22 specifies the rendering position of the confidential object within the frame image, and the moving image generation section 24 generates the moving image while performing the display restriction processing on the rendering position. With this configuration, the moving image generation device 1 can easily generate the publishing moving image which is processed so that details of the confidential object are hard to be recognized.

Further, in this embodiment, the rendering processing section 22 once writes into the frame buffer 14 the frame image (image which is not subjected to the display restriction processing) to be displayed on the screen of the display device 17, and the moving image generation section 24 performs the display restriction processing on the frame image written into the frame buffer 14 to generate the publishing moving image. Meanwhile, the display control section 23 uses the frame image written into the frame buffer 14 as it is to display the frame image on the display device 17. Therefore, the rendering processing section 22 does not need to separately render the frame image to be displayed on the display device 17, which is not subjected to the display restriction processing, and the frame image to be published which is subjected to the display restriction processing. However, the embodiment of the present invention is not limited to such configuration, and as long as the GPU 13 for realizing the rendering processing section 22 has a sufficient performance, the rendering processing section 22 may separately render each of the frame image to be displayed on the display device 17 and the frame image to be published.

Note that, a developer of the game program may desire to restrict the publishing of the entire frame image in a specific scene or the like of the game depending on details of the game. Moreover, for example, the developer of the game program may desire to restrict the publishing of the entire game moving image during a fixed period after the game program is released. When the publishing of the entire frame image is to be restricted as in the above-mentioned case, the application execution section 21 only needs to issue the rendering instruction for a transparent object overlapping the entire screen, separately from the rendering instruction for each object included in the frame image. In this case, the application execution section 21 issues the rendering instruction to the rendering position information output section 22b with the transparent object being set as the confidential object. In this manner, when the display control section 23 displays the frame image on the screen of the display device 17, the transparent object cannot be seen from the user's eye, and hence the user can view the normal game moving image. Meanwhile, the moving image generation section 24 executes the display restriction processing on the position of the transparent object specified by the rendering position information (in this case, the entire frame image). As a result, the entire frame image included in the publishing moving image reaches a state in which the entire frame image cannot be recognized by the human eye.

The embodiment of the present invention is not limited to the one described above. For example, in the description given above, the confidential object is entirely a two-dimensional object representing the confidential information, and the application execution section 21 specifies the coordinates of the position at which the confidential object is to be disposed in the frame image to output the rendering instruction for the confidential object, but the confidential object may be a three-dimensional object disposed in the three-dimensional space. In this case, the application execution section 21 specifies, for example, position coordinates in the three-dimensional space to perform the rendering instruction for respective objects including the confidential object. In response to this instruction, the rendering processing section 22 generates the frame image showing how respective objects subjected to the rendering instruction are disposed. At this time, the rendering processing section 22 performs various types of coordinate conversion (such as projection transformation) on the vertex of each object to calculate the position of each object in a two-dimensional frame image. In this manner, the region occupied by the confidential object disposed in the three-dimensional space within the two-dimensional frame image is determined. The rendering processing section 22 outputs information specifying this determined region as the rendering position information. With this configuration, even when the application execution section 21 knows only the position of the confidential object in the three-dimensional space, and does not know in advance the position in the frame image at which the confidential object is to be actually rendered, it is possible to perform the display restriction processing on the region including the confidential object to generate the publishing moving image.

Especially when the confidential object is a three-dimensional object disposed in the three-dimensional space and the frame image is rendered by three-dimensional image processing, a part of the confidential object or the entire confidential object may be hidden behind another normal object and may not appear in the frame image that is finally generated. In such a case, even if the rendering processing section 22 receives the rendering instruction for the confidential object, the moving image generation section 24 does not need to perform the display restriction processing for the confidential object that does not appear in the frame image, and it is rather desirable that the moving image generation section 24 not perform the display restriction processing. In view of this, the rendering processing section 22 may perform control so as to utilize known hidden surface removal processing to determine a part of the confidential object to be rendered that actually appears in the frame image, and to output the rendering position information specifying only the determined part. With this configuration, it is possible to avoid a situation in which unnecessary display restriction processing is executed for the confidential object that actually does not appear in the frame image.

Description is now given of a specific example of such processing. When receiving the rendering instruction for the confidential object, the rendering processing section 22 writes information indicating the positions of pixels constituting the confidential object into a stencil buffer which is provided separately from the frame buffer 14. Moreover, when as a result of rendering another normal object, the region of a part of the confidential object or the entire confidential object is hidden behind the rendered normal object and is thus not displayed, the rendering processing section 22 deletes from the stencil buffer positional information on pixels corresponding to the region hidden behind the normal object. As a result, when rendering of the frame image is finished, only positional information on pixels corresponding to a part of the confidential object that actually appears in the frame image remains in the stencil buffer. The moving image generation section 24 can utilize positional information on pixels included in the stencil buffer as the rendering position information. Specifically, the moving image generation section 24 sets a region including pixels of the confidential object that is specified by the stencil buffer as a region to be subjected to the display restriction processing. Alternatively, the rendering processing section 22 may use what is stored in the stencil buffer to determine a rectangular region including pixels indicating the confidential object, and output the rendering position information indicating the position and size of the rectangular region. In this case, the moving image generation section 24 can execute the display restriction processing as in the case described above where the confidential object is a two-dimensional object.

Note that, the case where the rendering processing section 22 performs three-dimensional image processing to render the frame image has been described above, but even when a two-dimensional object is disposed in the frame image, a plurality of objects may be overlapped with one another so that a part of the confidential object to be rendered or the entire confidential object does not actually appear in the frame image. Even in this case, for example, determination as to overlapping is performed by using the stencil buffer as in the above-mentioned case so that only the region corresponding to a part of the confidential object that finally appears in the frame image can be set as the region to be subjected to the display restriction processing.

Further, in the description given above, the rendering processing section 22 and the display control section 23 are realized by the GPU 13, but a part of their functions may be realized by the CPU 11. Moreover, the moving image generation section 24 may be realized by a dedicated video encoding circuit or the like instead of the CPU 11.

Further, in the description given above, the rendering position information output section 22b included in the rendering processing section 22 specifies the rendering position of the confidential information, and outputs the rendering position information. However, when the application execution section 21 knows in advance the rendering position of the confidential object, instead of the rendering processing section 22, the application execution section 21 may output the rendering position information.

Figure 5:
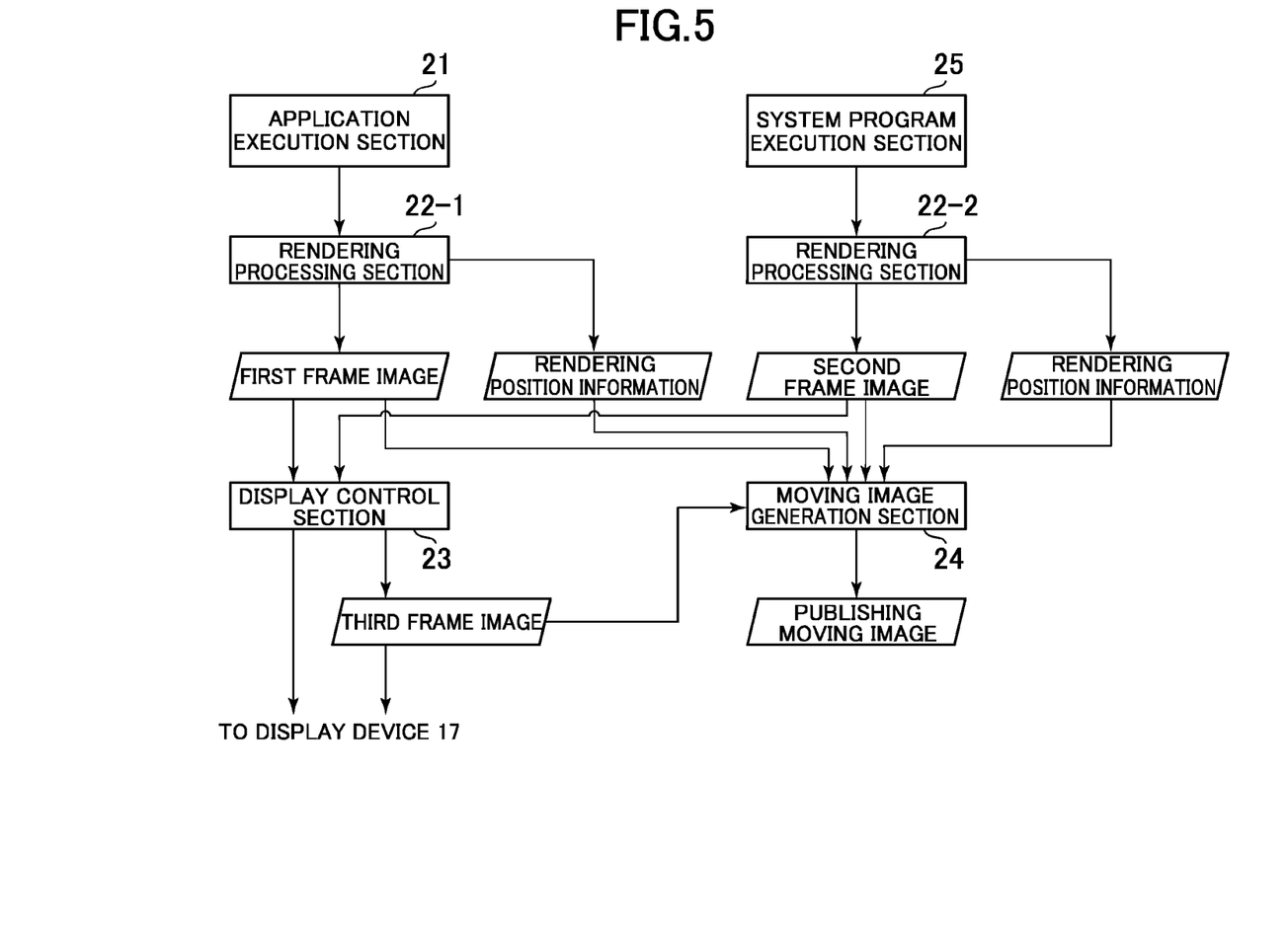
FIG. 5 is a block diagram illustrating a configuration of a moving image generation device according to another embodiment of the present invention.

Further, the moving image generation device 1 may include two systems of the resource for rendering the frame image. For example, the moving image generation device 1 executes, in addition to the game program, a system program performing processing relating to a system (such as displaying of a menu screen), and includes a GPU for rendering the frame image in response to the rendering instruction of this system program separately from the GPU for performing rendering in response to the rendering instruction of the game program. FIG. 5 is a functional block diagram illustrating an example of functions of a moving image generation device 1 in this case. In the example of FIG. 5, the moving image generation device 1 includes, in addition to the application execution section 21 for executing the game program, a system program execution section 25 for executing the system program. Further, the moving image generation device 1 includes two rendering processing sections 22-1 and 22-2. The rendering processing section 22-1 and the rendering processing section 22-2 render the frame images in response to the rendering instruction of the application execution section 21 and the rendering instruction of the system program execution section 25, respectively. Moreover, the moving image generation device 1 in the example of FIG. 5 includes two frame buffers 14-1 and 14-2. The frame image rendered by the rendering processing section 22-1 (hereinafter referred to as first frame image) and the frame image rendered by the rendering processing section 22-2 (hereinafter referred to as second frame image) are written into the frame buffer 14-1 and the frame buffer 14-2, respectively. Depending on the situation, the display control section 23 selectively displays anyone of the first frame image, the second frame image, and a third frame image on the screen of the display device 17. The third frame image is a frame image obtained by synthesizing the first frame image and the second frame image. Further, the moving image generation section 24 also uses any one of the first frame image, the second frame image, and the third frame image to generate the publishing moving image. At this time, when using the first frame image to generate the publishing moving image, the moving image generation section 24 performs the display restriction processing on a region specified by the rendering position information output by the rendering processing section 22-1. When using the second frame image to generate the publishing moving image, the moving image generation section 24 performs the display restriction processing on a region specified by the rendering position information output by the rendering processing section 22-2. Moreover, when using the third frame image to generate the publishing moving image, the moving image generation section 24 uses pieces of rendering position information output by the rendering processing sections 22-1 and 22-2 both to perform the display restriction processing on every region specified by those pieces of rendering position information. In this manner, the publishing moving image on which the display restriction processing is performed appropriately on the confidential information can be generated. Note that, when the first frame image and the second frame image are synthesized to generate the third frame image, both frame images are superimposed on one another so that one of the frame images is disposed on the front surface of the other of the frame images. When it is assumed here that the second frame image is disposed on the front surface of the first frame image, a part of the confidential object included in the first frame or the entire confidential object included in the first frame image may be hidden behind the normal object included in the second frame image and may not appear within the third frame image. In such a case, as in the case where the plurality of objects are overlapped with one another within one frame image, the region corresponding to the part of the confidential object that is hidden behind the normal object may be excluded from the region to be subjected to the display restriction processing.

Note that, there may also be a case where the entire second frame image which is rendered in response to the rendering instruction of the system program execution section 25 needs to be set as the confidential object. In this case, the rendering processing section 22-2 outputs the rendering position of every object included in the second frame image as the rendering position information. In this manner, for example, when the third frame image is used to generate the publishing moving image, it is possible to perform the display restriction processing for, of the objects included in the third frame image, every object that has been rendered in response to the rendering instruction of the system program execution section 25. Alternatively, in a case where the third frame image is to be displayed on the display device 17, when the second frame image does not include the confidential object, the moving image generation section 24 may use the third frame image as it is to generate the publishing moving image, and when the second frame image includes the confidential object, the moving image generation section 24 may use the second frame image instead of the third frame image to generate the publishing moving image.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A moving image generation device, comprising:
   a rendering section for rendering a frame image including a plurality of image elements;
   a rendering position information output section for outputting rendering position information specifying a rendering position within the frame image of a confidential element whose viewing is to be restricted among the plurality of image elements; and
   a moving image generation section for simultaneously generating
      a restricted moving image by using the frame image, and when generating the moving image, performing display restriction processing on a target region within the frame image which is specified by the rendering position information, and
      an unrestricted moving image without the confidential element, wherein the restricted moving image is transmitted to one or more restricted users, wherein the unrestricted moving image is transmitted to one or more unrestricted users different from the one or more restricted users, and wherein each frame image of the restricted moving image and each frame image of the unrestricted moving are generated at the same time.

2. The moving image generation device according to claim 1, further comprising an application execution section for executing an application program, wherein the rendering position information output section receives a rendering instruction for the confidential element from the application execution section, specifies the rendering position of the confidential element based on details of the rendering instruction, and outputs a rendering command for the confidential element to the rendering section.

3. The moving image generation device according to claim 2, wherein the application execution section outputs the rendering command for an image element other than the confidential element among the plurality of image elements directly to the rendering section.

4. The moving image generation device according to claim 1, wherein as the display restriction processing, the moving image generation section causes a bit rate of the target region to be lower than a bit rate of a region other than the target region to perform encoding.

5. A moving image generation method, comprising:

rendering a frame image including a plurality of image elements;

outputting rendering position information specifying a rendering position within the frame image of a confidential element whose viewing is to be restricted among the plurality of image elements;

simultaneously generating a restricted moving image by using the frame image, and when generating the moving image, performing display restriction processing on a target region within the frame image which is specified by the rendering position information and an unrestricted moving image without the confidential element, wherein each frame image of the restricted moving image and each frame image of the unrestricted moving image are generated at the same time;

transmitting the restricted moving image to one or more restricted users, and transmitting the unrestricted moving image to one or more unrestricted users different from the one or more restricted users.

6. A non-transitory computer readable information storage medium having a program stored thereon, the program including instructions for causing a computer to execute the procedures of:

rendering a frame image including a plurality of image elements;

outputting rendering position information specifying a rendering position within the frame image of a confidential element whose viewing is to be restricted among the plurality of image elements;

simultaneously generating a restricted moving image by using the frame image, and when generating the moving image, performing display restriction processing on a target region within the frame image which is specified by the rendering position information and an unrestricted moving image without the confidential element, wherein each frame of the restricted moving image and each frame image of the unrestricted moving image are generated at the same time;

transmitting the restricted moving image to one or more restricted users, and transmitting the unrestricted moving image to one or more unrestricted users different from the one or more restricted users.

* * * * *